(12) United States Patent
Ahmed et al.

(10) Patent No.: US 9,348,685 B2
(45) Date of Patent: May 24, 2016

(54) INTERMEDIATE DATABASE MANAGEMENT LAYER

(71) Applicant: Apple Inc., Cupertino, CA (US)

(72) Inventors: Shahid Ahmed, Los Altos, CA (US); Blake R. Bauman, San Jose, CA (US); Hengki Suwandi, San Leandro, CA (US); Mohit Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/684,107

(22) Filed: Apr. 10, 2015

(65) Prior Publication Data

US 2015/0324245 A1 Nov. 12, 2015

Related U.S. Application Data

(63) Continuation of application No. 13/559,523, filed on Jul. 26, 2012, now Pat. No. 9,032,247.

(51) Int. Cl.
*G06F 11/00* (2006.01)
*G06F 11/07* (2006.01)
*G06F 17/30* (2006.01)
*G06F 11/14* (2006.01)
*G06F 11/20* (2006.01)

(52) U.S. Cl.
CPC .......... *G06F 11/076* (2013.01); *G06F 11/0709* (2013.01); *G06F 11/0769* (2013.01); *G06F 11/0793* (2013.01); *G06F 11/1482* (2013.01); *G06F 17/3056* (2013.01); *G06F 17/30289* (2013.01); *G06F 11/2094* (2013.01); *G06F 2201/80* (2013.01)

(58) Field of Classification Search
USPC ................................. 714/6.3, 6.1, 2
See application file for complete search history.

(56) References Cited

U.S. PATENT DOCUMENTS

| 5,893,911 | A | 4/1999 | Piskiel et al. |
| 5,978,577 | A | 11/1999 | Rierden et al. |
| 8,260,757 | B1 | 9/2012 | Chatterjee et al. |
| 8,898,513 | B2 * | 11/2014 | Grube ................. G06F 11/2094 711/154 |
| 2002/0035556 | A1 | 3/2002 | Shah et al. |
| 2008/0256078 | A1 | 10/2008 | Bhashyam |
| 2009/0177765 | A1 | 7/2009 | Stute et al. |
| 2011/0106789 | A1 | 5/2011 | Gao et al. |
| 2013/0103972 | A1 * | 4/2013 | Ozer ................... G06F 11/0727 714/2 |
| 2014/0281748 | A1 * | 9/2014 | Ercegovac .......... G06F 11/0727 714/49 |

* cited by examiner

*Primary Examiner* — Sarai Butler
(74) *Attorney, Agent, or Firm* — Blakely, Sokoloff, Taylor & Zafman LLP

(57) ABSTRACT

Disclosed herein are systems, methods, and non-transitory computer-readable storage media for using an intermediate database management layer to manage communications between an application layer and a database layer. The database management layer can receive an initial communication from the application layer and transmit a subsequent communication to a particular database based upon a rule. The rules can specify the particular database based upon the initial communication and an availability status of the database. The rules specify criteria by which the initial communication is identified and logic specifying the particular database to receive the subsequent communication based upon the identification of the initial communication. The rules can specify a plurality of potential particular databases to receive the subsequent communication and an order in which to select one of the databases to receive the subsequent communication based upon the determined availability status of each of the potential particular databases.

16 Claims, 11 Drawing Sheets

```
# MySimpleProc should execute on MyPrimaryDB
rule "Simple Stored Procedure"
    when
        $db : DecisionBean (api == "mypkg.MySimpleProc")
    then
        $db . setTarget("MyPrimaryDB");
end
```

FIG. 2

```
rule "Odd DSIDs should be sent to Shard1, even to Shard2"
    when
        $db : DecisionBean (api == "mypkg.GetAccountInfo")
    then
        long dsid = (Long)$db.getParameter(1);
        if (dsid % 2) == 1) {
            $db . setTarget("DSIDShard1");
        }
        else {
            $db . setTarget("DSIDShard2");
        }
end
```

FIG. 3

Current Values for Instance — 402

| Instance | Uptime | Session | Opration Failures | MemConfig (MB) | MemAvail (%) | Threads | Classes Loaded | Version | OPS | Avg Res |
|---|---|---|---|---|---|---|---|---|---|---|
| 8305 | 7d 13h 47m 14s | 1 | 0 n/a | 1015.69 | 91.97 | 65 | 4871 | 2.2.0.321 | 0.000 | 0.0 |
| 8309 | 7d 13h 47m 11s | 1 | 0 n/a | 1015.69 | 95.88 | 65 | 4871 | 2.2.0.321 | 0.000 | 0.0 |
| 8304 | 7d 13h 47m 11s | 1 | 0 n/a | 1015.69 | 93.32 | 65 | 4871 | 2.2.0.321 | 0.000 | 0.0 |
| 8308 | 7d 13h 47m 9s | 1 | 0 n/a | 1015.69 | 96.76 | 65 | 4874 | 2.2.0.321 | 0.000 | 0.0 |
| 8302 | 7d 13h 47m 7s | 1 | 0 n/a | 1015.69 | 95.71 | 65 | 4869 | 2.2.0.321 | 0.000 | 0.0 |
| 8303 | 7d 13h 47m 5s | 1 | 0 n/a | 1015.69 | 95.94 | 65 | 4871 | 2.2.0.321 | 0.000 | 0.0 |
| 8306 | 7d 13h 47m 4s | 1 | 0 n/a | 1015.69 | 97.21 | 65 | 4869 | 2.2.0.321 | 0.000 | 0.0 |
| 8307 | 7d 13h 47m 2s | 1 | 0 n/a | 1015.69 | 95.35 | 64 | 4871 | 2.2.0.321 | 0.000 | 0.0 |
| 8310 | 7d 13h 47m 1s | 1 | 0 n/a | 1015.69 | 94.42 | 65 | 4871 | 2.2.0.321 | 0.000 | 0.0 |
| 8301 | 7d 13h 47m 14s | 1 | 0 n/a | 1015.69 | 92.87 | 65 | 5067 | 2.2.0.321 | 0.000 | 0.0 |

Page 1 of 1   500

*Non-registered server

Current Value for Host — 404

| Hostname | QDB Instances | CPU used (%) | Mem Avail (MB) | Mem Used (MB) | Disk Used (%) | CloseWaits (#) |
|---|---|---|---|---|---|---|
| Indra.corp.com | 10 | | | | | |

Page 1 of 1   500

View 1 - 1 of 1

FIG. 4A

DASHBOARD
for Instance ▸
for Host ▸
Topology ▸
Transaction Detail ▸
Transaction Log ▸
Administration
Analytics Last refresh at:
2012-02-14@10:05:13
Refresh every [10 sec ▾]
☐ Autorefresh  ☐ Pause Data Center:@Maiden

| Hostname | Ports |
|---|---|
| pavomont.corp.com | 9350 |
| | 9351 |
| | 9352 |
| | 9353 |
| | 9354 |

Transactions  Sessions (11)

| Txn Id ▾ | Time of Query | Query | Exec(ms) | Database | Response | SID |
|---|---|---|---|---|---|---|
| 20120214:18:01:17.492-9265092997 | 2012-02-14@10:01:17 | /* QDBHINT beta */ select name, | 81 | Beta | 0 | 1051 |
| 20120214:18:01:17.492-9265092997 | 2012-02-14@10:01:17 | commit | 80 | Beta | 0 | 1051 |
| 20120214:18:01:35.542-9265092997 | 2012-02-14@10:01:35 | commit | 81 | Alpha | 0 | 1079 |
| 20120214:18:01:35.542-9265092997 | 2012-02-14@10:01:35 | delete from HENGKI_TEST1 whe | 80 | Alpha | 1 | 1079 |
| 20120214:18:01:35.542-9265092997 | 2012-02-14@10:01:35 | update HENGKI_TEST1 set varch | 80 | Alpha | 1 | 1079 |
| 20120214:18:01:35.542-9265092997 | 2012-02-14@10:01:35 | Insert into HENGKI_TEST1 value | 80 | Alpha | 1 | 1079 |
| 20120214:18:03:23.191-9265092997 | 2012-02-14@10:03:23 | commit | 80 | Beta | 0 | 1008 |
| 20120214:18:03:23.191-9265092997 | 2012-02-14@10:03:23 | select name, balance, dsid from | 80 | Beta | 1 | 1006 |
| 20120214:18:04:22.299-9265092997 | 2012-02-14@10:04:22 | Insert into HENGKI_TEST1 value | 80 | Alpha | 1 | 1025 |
| 20120214:18:04:22.299-9265092997 | 2012-02-14@10:04:22 | delete from HENGKI_TEST1 whe | 81 | Alpha | 1 | 1025 |
| 20120214:18:04:22.299-9265092997 | 2012-02-14@10:04:22 | commit | 80 | Alpha | 0 | 1025 |
| 20120214:18:04:24.876-9265092997 | 2012-02-14@10:04:24 | commit | 80 | Beta | 0 | 1006 |
| 20120214:18:04:24.876-9265092997 | 2012-02-14@10:04:24 | select name, balance, dsid from | 80 | Beta | 0 | 1006 |
| 20120214:18:04:15.303-9265092997 | 2012-02-14@10:04:15 | {call hengki_proc_radar_four('?, | 80 | Alpha | 0 | 1079 |
| 20120214:18:03:44.738-9265092997 | 2012-02-14@10:03:44 | commit | 80 | Alpha | 0 | 1079 |
| 20120214:18:03:44.738-9265092997 | 2012-02-14@10:03:44 | /* QDBHINT beta */ select name, | 80 | Beta | 0 | 1051 |
| 20120214:18:01:56.204-9265092997 | 2012-02-14@10:01:58 | {call hengki_proc_radar_four('?, | 81 | Alpha | 0 | 1035 |

Server Administration

| Action | Button |
|---|---|
| Run Diagnostics on All Instances | Run Diagnostics on All QDB instances |
| Auto Failover option: | Select a Failover Option ◆ Apply |
| Failover across datacenter: | Select a dc Failover Option ◆ Apply |
| Enable/Disable periodic down time detection | Enable Downtime Detection ◆ Apply |
| Enable/Disable error code checking | Select a Error Code State Checking Option ◆ Apply |
| Re-establish a JGroups cluster | Select a Data Center ◆ Apply |

Status By Instance

| Instance ▼ | Auto Failover | FailOver Across DC | PeriodicState Check | Error Code State Check |
|---|---|---|---|---|
| 9350 Run Diagnostics | true | true | true | true |
| 9351 Run Diagnostics | true | true | true | true |
| 9352 Run Diagnostics | true | true | true | true |
| 9353 Run Diagnostics | true | true | true | true |
| 9354 Run Diagnostics | true | true | true | true |

◁◁ Page 1 of 1 ▷▷　　View 1 - 5 of 1

X-Card | Enter Proxy Mode | | Reload this rules file to Quantum Server

Rules Loaded By Quantum Server

| Host port ▾ | Last Rules File Load Time | Proxy Mode |
|---|---|---|
| 6301 | 2011-09-16@05:05:24 | no |
| 6301 | 2011-09-16@05:05:30 | no |
| 6301 | 2011-09-16@05:05:30 | no |
| 6301 | 2011-09-16@05:05:26 | no |
| 6301 | 2011-09-16@05:05:35 | no |
| 6303 | 2011-09-16@05:05:28 | no |
| 6303 | 2011-09-16@05:05:30 | no |
| 6303 | 2011-09-16@05:05:31 | no |
| 6303 | 2011-09-16@05:05:23 | no |
| 6303 | 2011-09-16@05:05:30 | no |
| 6301 | 2011-09-16@05:05:35 | no |
| 6303 | 2011-09-16@05:05:30 | no |
| 6301 | 2011-09-16@05:05:32 | no |
| 6301 | 2011-09-16@05:05:30 | no |
| 6303 | 2011-09-16@05:05:32 | no |
| 6303 | 2011-09-16@05:05:30 | no |
| 6303 | 2011-09-16@05:05:32 | no |
| 6301 | 2011-09-16@05:05:30 | no |
| 6301 | 2011-09-16@05:05:35 | no |
| 6303 | 2011-09-16@05:05:33 | no |

|◂ ◂| Page 1 of 1 |▸ ▸| 500  View 1 - 20 of 20

DASHBOARD
Current Values
Transactions
Administration
Rules File ›
Historical
FAQ All times in Coparing time
Date could be up to 5 minutes old

Rules

| Active▾ | Version | Creation Date | Update Date | Rules File |
|---|---|---|---|---|
| yes | 24629 | 2011-07-28 @10:52:0 | 2011-09-15 @14:33:3 | package.com.1st.retail.xcard.rules |
| | | | | import.com.server.core.rules.DecisionBean |
| | | | | import.com.server.core.connection.DataCenter |
| | | | | import.java.util.regax.Matcher |
| | | | | import.java.util.regax.Pattern |
| | | | | "Activate Certificate" |
| | | | | $db : DecisionBean (api == "pkgxcard.activate_certificate") |

System Health - Query Analysis

Start Date/Time: 2012-02-14@04:18    End Date/Time: 2012-02-14@10:18

Period: ○1/2h ○1h ●8h ○1d ○7d    [Get Date]

Query Analysis

| Query | Counts (C) | Avg. Time(T) | Cost {C x T} | % Errors |
|---|---|---|---|---|
| Insert into HENGKI_TEST1 values(?, ?, ?) | 204466 | 80 | 16490464 | 0 |
| update HENGKI_TEST1 set varchar_2 = ?, varchar_3 = ? w | 81422 | 80 | 6567855 | 0 |
| /* QDBHINT alpha */ select name, balance, dsid from qdb_f | 40543 | 80 | 3269593 | 0 |
| select code, cardprefix, description, vendorname, servicep | 40342 | 80 | 3265929 | 0 |
| select code, cardprefix, description, vendorname, servicep | 40509 | 81 | 3282041 | 0 |
| delete from HENGKI_TEST1 where id = ? | 204464 | 80 | 16456363 | 0 |
| commit | 652489 | 80 | 52594795 | 0 |
| /* QDBHINT beta */ select name, balance, dsid from qdb_te | 40496 | 80 | 3266771 | 0 |
| select name, balance, dsid from qdb_test_dsid where dsid= | 163110 | 80 | 13168018 | 0 |
| {call hengki_proc_radar_four(?, ?, ?)} | 123028 | 80 | 9950241 | 0 |

◁◀ |Page 1 of 0| ▶▷    View 1 - 10 of 10

Database Distribution

| Query | Alpha counts | Beta counts |
|---|---|---|
| Insert into HENGKI_TEST1 values(?, ?, ?) | 203335 | |
| update HENGKI_TEST1 set varchar_2 = ?, varchar_3 = ? where id = ? | 80291 | |
| /* QDBHINT alpha */ select name, balance, dsid from qdb_test_dsid | 39412 | |
| select code, cardprefix, description, vendorname, serviceprovider, createdata, m | 39211 | |
| select code, cardprefix, description, vendorname, serviceprovider, createdata, m | 39378 | |
| delete from HENGKI_TEST1 where id = ? | 203333 | |
| commit | 492764 | 157463 |
| /* QDBHINT beta */ select name, balance, dsid from qdb_test_dsid | | 39365 |
| select name, balance, dsid from qdb_test_dsid where dsid=? | 43880 | 116968 |

FIG. 4E

INTERMEDIATE DATABASE MANAGEMENT LAYER

RELATED APPLICATIONS

The application is a Continuation of U.S. application Ser. No. 13/559,523, filed on Jul. 26, 2012, entitled "Intermediate Database Management Layer," the content of which is incorporated herein by reference in its entirety.

BACKGROUND

1. Technical Field

The present disclosure relates to databases and more specifically to an intermediate database management layer that manages communications to the databases.

2. Introduction

Modern computing systems rely on consistent access to databases to access large amounts of stored data. Almost every online service relies on access to a database, for example, online stores and marketplaces rely on these databases to manage all their inventory and transactions, web servers rely on databases to store content for web pages, etc. This high dependency makes minimizing downtime an extremely high priority. Inevitably, a database will become unavailable due to any number of factors such as scheduled maintenance, unexpected error, or disaster. Accordingly, steps need to be taken to protect against extended downtime and data loss.

Current methods of protection include maintaining multiple datacenters in various geographic locations that include duplicate databases. In the event of a failure or disaster at one database, backups of the data are safely stored at another datacenter. While current methods do ensure protection of the data, seamlessly transitioning between one datacenter to another is still highly problematic.

Current solutions generally rely on a failure or error to be received by a client from a primary datacenter that results in the client retransmitting the command to a backup datacenter. This exposes the database's state to the client which is undesirable. Further, code to manage rerouting communications to a backup datacenter needs to be implemented into the application software at the client end. Making changes to the application software exposes stable software to the possibility of new bugs as well as makes the solution dependent on the client implementing the failover logic correctly.

Another problem with current solutions is that there is no consistency in determining which databases are unavailable. For example, current solutions rely on receiving a failure from a database and then rerouting the command to an alternate database. While in some cases the database might truly be unavailable, sometimes the failure itself might be an error or not the result of the database being truly unavailable. As a result, various instances of an application can be storing data in different databases. This resulting "split personality" has negative consequences. One negative consequence being that data is store inconsistently across multiple databases, making it unclear as to which database is the primary database and which is a duplicate. This can result in data loss and inconsistent or inaccurate results when requesting data. Accordingly, a need exists for an improved database management system.

At least one prior attempt at solving this problem is known by the name C-JDBC, and this "solution" provides a database management layer that applications communicate with when they need to access a database. The database management layer detects when databases are down, and performs a failover to another database to handle the transaction. While such a system moves the state-of-the-art in the right direction, the solution is not robust enough for commercial application.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for using an intermediate database management layer to manage communications between an application layer and a database layer. The database management layer can be configured to receive an initial communication from a particular application in the application layer and transmit a subsequent communication to a particular database amongst a plurality of databases in the database layer based upon a rule. For example, the communication can be a command to retrieve data from a database in the database layer. The database management layer can be configured to determine a particular database to execute the request. The database management layer can thus transparently handle requests from a particular application in the application layer to a particular database. This transparent handling of the request enables the application layer to communicate with the database management layer using substantially the same syntax as the particular application would use if it were communicating directly to the particular database.

The rules can specify the particular database based upon an analysis of the initial communication as well as an availability status of the databases in the database layer. For example, the rules can specify criteria by which the initial communication is identified as well as logic specifying the particular database to receive the subsequent communication based upon the identification of the initial communication. For example, the rules can specify that a communication be identified based upon a portion of the text of the communication such as a database process name and the logic can specify the particular database based upon the identified database process name.

In some embodiments, the rules can specify identifying the communication based upon hints placed in the initial communication that do not affect the function of the initial communication. For example, the hint can be placed as a comment associated with the communication.

In some embodiments, the rules can specify identifying the communication based upon metadata describing the particular application. For example, this can include a country code or IP address associated with the particular application and the logic in the rules can specify a particular database based upon the metadata.

In some embodiments, the rules can specify a plurality of potential particular databases to receive the subsequent communication. The rules can further specify an order in which to select one of the databases to receive the subsequent communication based upon the determined availability status of each of the potential particular databases.

In some embodiments the rules can specify that the subsequent communication be an alternate syntax of the initial communication that is compatible with the particular database.

To determine the availability of a database in the database layer, the database management layer can be configured to monitor the status of the database by transmitting a status request to the database and monitoring transmission data associated with the database. The database management layer can further mark that an error was detected at the database upon a determination the database was insufficiently responsive. A database can be insufficiently responsive if the database is down, or it is reporting an error code that indicates that it is not providing the desired response. For example, it can be determined that a database is insufficiently responsive upon the status request not returning a successful response and/or upon a determination that the transmission data associated with the database includes a predetermined error.

In some embodiments, the database management layer can be comprised of multiple database management instances, each configured to manage communications between the application layer and the database. Each of the database management instances can also be configured to communicate with the other database management instances to share data and determine the availability status of the database. For example, each of the database management instances can be further configured to transmit a message to other database management instances, upon marking that the error was detected at the database. The message can notify the other database management instances that the error was detected at the database. Upon a determination that a predetermined number of the database management instances have marked that an error was detected at the database, each database management instance can make the database unavailable and begin rerouting communications targeted to be transmitted to the database to an alternate particular database. In some embodiments, each of the database management instances directly corresponds with a particular application in the application layer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an exemplary embodiment of a routing rule in which a command is identified by the procedure name;

FIG. 3 illustrates an exemplary embodiment of a routing rule in which the routing rule identifies the command based on multiple criteria;

FIGS. 4A-4E illustrates screenshots of an exemplary reporting interface;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
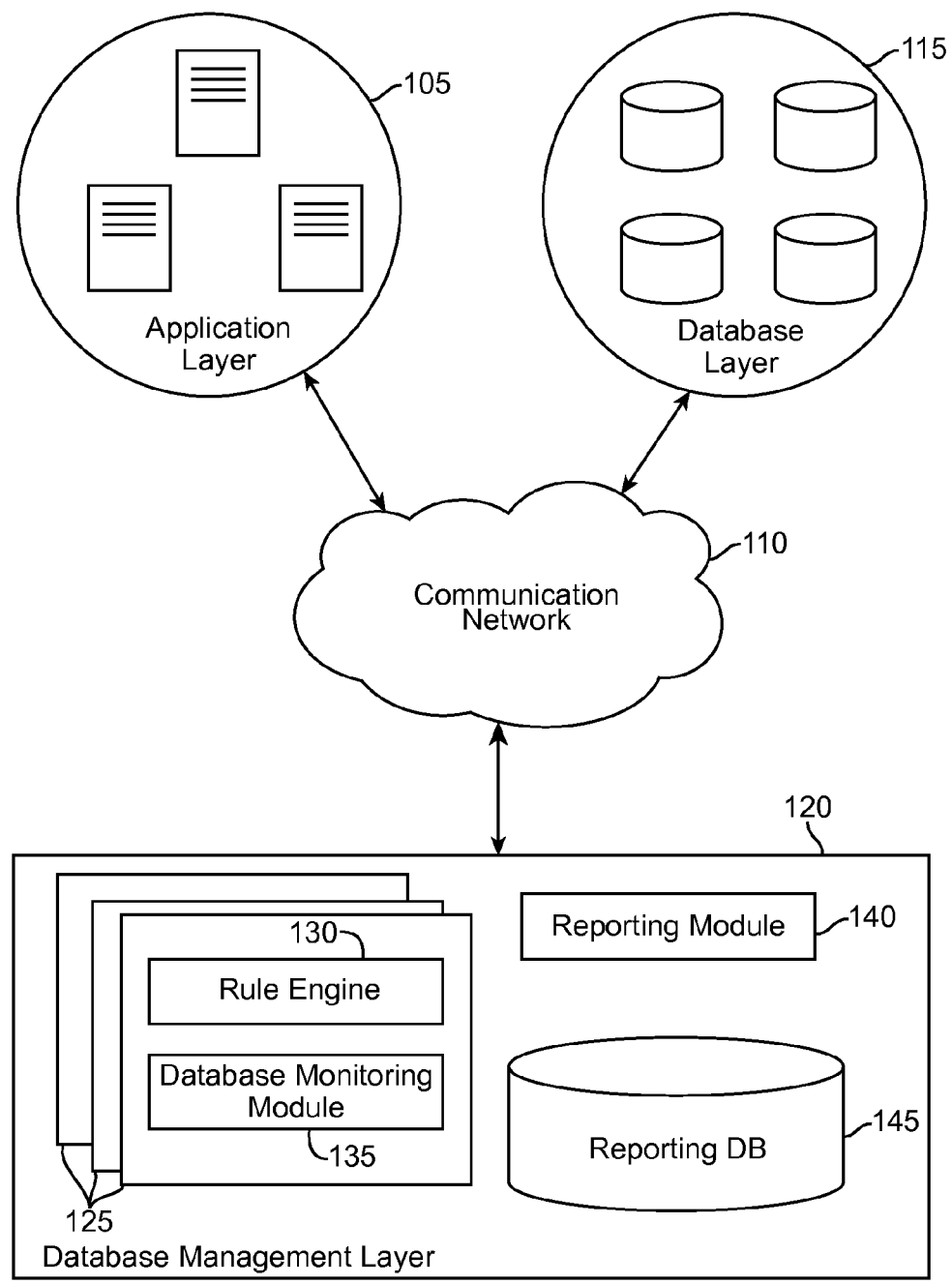
FIG. 1 illustrates a general purpose computing environment wherein communication between an application layer and a database layer is managed by an intermediary database management layer.

FIG. 1 illustrates a general purpose computing environment wherein communication between an application layer 105 and a database layer 115 is managed by an intermediary database management layer 120.

The application layer 105 can consist of one or more application servers configured to host and run an application. Applications running on the application layer 105 can be configured to utilize databases in network communication with the application layer 105. The application layer 105 can thus be configured to send data commands to be performed on a particular database or databases in the database layer 115. For example, a data command can include a command to store data, retrieve data, combine data, delete data, etc.

The database layer 115 can consist of a plurality of databases configured to store data for applications running in the application layer 105. The databases in the database layer 115 can be in multiple datacenters located at different geographic locations. Physically separating the databases can protect from data loss in the event of a power outage, virus, or catastrophic event such as fire, natural disaster, etc.

Further, duplicates of databases can be created and maintained to back up data as well as provide an alternate source in case a primary source is unavailable. For example, commands targeted to a particular database that is unavailable can be rerouted to an available duplicate database. This can eliminate downtime and provide the application layer 105 with constant access to the data stored in the database layer 115. The term database is used for simplicity and is not meant to be limiting. A database can be any number of databases located in one location or multiple locations.

The database management layer 120 can be configured to manage communication between the application layer 105 and the database layer 115. This can include monitoring the availability of databases in the database layer 115 and properly routing data commands received from a particular application in the application layer 105 to an appropriate available database, as well as transmitting back to the application layer 105 any data resulting from a data command.

Commands received at the database management layer 120 from the application layer 105 can be routed to a particular database based upon routing rules. Routing rules can specify the appropriate database to receive a command based upon an analysis of the command itself as well as the determined availability of the databases in the database layer 115.

Using an intermediate database management layer 120 to route commands provides several advantages. One advantage is that the application layer 105 does not require modification when changes are made to the database layer 115. Rather, changes can be made to the routing rules at the intermediary database management layer 120 and commands received from the application layer 105 can be seamlessly routed to an appropriate database. This allows rules to be changed without any downtime because the application layer 105 is not affected.

A second advantage is seamless failover in the case of a database failure. Failover can be a backup plan when a database is down or unavailable. For example, failover can be maintaining a backup database that is a duplicate of a particular database and rerouting a command intended for the particular database to the backup database upon a determination that the particular database is down or unavailable. The database management layer 120 can monitor the availability of the databases and reroute commands to an available duplicate database in the event of a database being determined to be unavailable. The failover can be automated and thus does not require human intervention. The application layer 105 thus is unaware of failures at the database layer 115 and performs seamlessly.

A third advantage is that planned database downtime does not affect the application layer 105. For example, changes to the routing rules can be made prior to databases being made unavailable. The changes to the routing rules can specify alternate databases to receive the commands and thus databases can be easily taken offline for software upgrades, hardware upgrades, etc.

A fourth advantage is that the database management layer 120 can be implemented to work with multiple database types and command syntax. For example, the routing rules can be configured to recognize various command syntax and, if necessary, convert the command into syntax suitable for a determined particular database.

Each layer 105, 115, 120 can consist of one or more computing devices connected to a communication network 110 and configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network 110 can also be implemented using any type or types of physical media, including wired communication paths and wireless communication paths associated with one or more service providers. Additionally, the communication network 110 can be configured to support the transmission of messages formatted using a variety of protocols.

A computing device can be any type of general computing device capable of network communication with other computing devices. For example, the computing device can be a personal computing device such as a desktop or workstation, a business server, database, or a portable computing device, such as a laptop, smart phone, or a post-pc device. The computing device can include some or all of the features, components, and peripherals of computing device 800 of FIG. 8. To facilitate communication with other computing devices, the computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

The database management layer 120 can consist of one or more database management servers running multiple database management instances 125. In some embodiments, a load balancer can be used to distribute traffic across the different database management instances 125.

Each of the database management instances 125 can include a rule engine 130 and a database monitoring module 135. The rule engine 130 can be configured to route commands to an appropriate database based upon routing rules. The routing rules can specify the appropriate database to receive a command based upon an analysis of the command itself as well as the determined availability of the databases in the database layer 115. For example, the routing rules can specify criteria by which a command is identified as well as logic dictating a particular database to receive the identified command. The criteria identifying an appropriate database can be based upon the received command itself, such as the procedure name, statement, statement parameters, combination thereof, etc.

As a simple example, in some embodiments, the routing rules can identify the command by the procedure name and the logic can specify which particular database should receive each type of command. For example, the rules can specify that all commands including procedure name "Procedure One" be routed to "Database 1," whereas all commands including procedure name "Procedure Two" be routed to "Database 2." This is just one example and it is not meant to be limiting. One skilled in the art would recognize that the routing rules can be configured in any number of ways taking into consideration any number of factors or combination thereof.

The rule engine 130 can also be configured to change routing rules without the system incurring any downtime. For example, the rule engine 130 can be configured to allow a database administrator to alter the routing rules or enter new routing rules while the previously set routing rules are in place. Upon the new rules being entered, all commands can be routed based upon the new rules. Thus, the transition is seamless to the application layer 105.

FIG. 2 illustrates an exemplary embodiment of a routing rule in which a command is identified by the procedure name. As illustrated, the rule specifies that when the procedure name equals "mypkg.MySimpleProc" the particular database should be set as "MyPrimaryDB."

FIG. 3 illustrates another exemplary embodiment of a routing rule. In this embodiment, the routing rule identifies the command based on multiple criteria. As illustrated, the routing rule first identifies the command based upon the procedure name. If the procedure name equals "mypkg.GetAccountInfo" the routing rule dictates that the command should be further identified based upon a statement parameter associated with the command. In this case, the statement parameter is a data set identification (DSID) number. The logic dictates that if the command has an odd DSID, the particular database should be set as "DSIDShard1" and if the DSID is even the particular database should be set as "DSIDShard2." A modulus function is used to separate the DSIDs into the two groups. This is only one example and one skilled in the art would recognize that modulus function can be used to separate the DSIDs into any number of groups.

Returning to FIG. 1, the routing rules can also be configured to specify a particular database based upon the availability of databases in the database layer 115. The routing rules can specify an order in which commands should be routed to alternate databases based upon a particular database being determined to be unavailable. For example, the routing rules can specify that commands targeted for Database 1 should be routed to Database 3 if Database 1 is unavailable and then to Database 5 if both Database 1 and Database 3 are unavailable.

In addition to routing commands, the rule engine 130 can also be configured to convert data commands into syntax compatible with the particular database. To accomplish this, the routing rules can be configured to recognize multiple types of database management syntax and the routing rules can specify a resulting command to be sent to the particular database based upon the analysis of the initial command as well as data known about the particular database. For example, in some embodiments, the rule engine can be configured to recognize the type of database that is targeted and then select an appropriate syntax for the subsequent command. The subsequent command can thus be an equivalent of the initial command in an appropriate syntax to communicate with the particular database. This allows the database management layer to be vendor neutral and be implemented with multiple database types and applications.

To determine the availability of the databases, each of the database management instances 125 can include a database monitoring module 135 configured to monitor the availability of the databases in the database layer 115 and communicate with the other database management instances 125 when an error is detected at a database.

The database monitoring module 135 can be configured to monitor the databases in numerous ways. In some embodiments, the database monitoring module 135 can be configured to monitor the database layer 115 by actively requesting the status of databases. For example, the database monitoring module 135 can be configured to periodically send a transmission requesting the status of a database. Upon receiving an error, failure, or no reply in response to the request, the database monitoring module 135 can mark that an error was detected at the database.

In some embodiments, the database monitoring module 135 can be configured to monitor the database layer by monitoring transactions with the database layer. For example, the database monitoring module 135 can be configured to inspect transactions for database exceptions to check for known fatal exceptions. Upon finding a known fatal exception, the database monitoring module 135 can mark that an error was detected at the database associated with the exception.

Upon detecting an error at a database, the database monitoring module 135 can be configured to send a message to the other database management instances 125 alerting them that the error has been detected. In some embodiments, each of the database management instances 125 can make the database unavailable upon receiving the message and thus can reroute commands targeted for the unavailable database.

In some embodiments, a database is not made unavailable based upon only one database management instance 125 detecting an error. Rather, the multiple database management instances 125 are configured to make a group decision. For example, a database can remain available until an error has been detected by a predetermined number of the database management instances 125, which broadcasts detection of such errors to each of the other database management instances 125.

The predetermined number can be any number less than or equal to the number of database management instances 125. For example, the predetermined number can represent a quorum of the minimum number of database management instances 125 necessary to determine that a database is unavailable. In some embodiments, the predetermine number can be based on historical data indicating that a certain number of database management instances 125 being in agreement results in an accurate result. For example, it can be determined that if four or more of database management instances 125 detect a failure, that the database is unavailable 95% of the time. The predetermined number can thus be set to be four. In some embodiments, the predetermined number can be set to a number that results in near 100% accuracy. The percentage chosen to represent an accurate result is just one example and is not meant to be limiting. One skilled in the art would appreciate that any percentage can be used.

In some embodiment, the predetermined number can be based upon a percentage of the total number of database management instances 125. For example, the predetermined number can be 50% of all of the database management instances 125. Thus, if there are ten database management instances 125, the predetermined number can be 50% or five database management instances 125. In some embodiments, the predetermined number can be based upon a simple majority of the database management instances 125. A simple majority can be any number over 50%. Thus, if there are ten database management instances 125, the predetermined number would be six because it is the lowest number of database management instances 125 that exceeds 50% of the total number of database management instances 125.

To determine the availability of a database as a group, each of the database management instances 125 can transmit a message to the other database management instances 125 that an error was detected at the database, but rather than immediately make the database unavailable, each of the database management instances 125 can keep a count of the number of other database management instances 125 that have detected an error at the database. Upon the error count associated with a database reaching the predetermined number representing a quorum, each of the database management instances 125 can make the database unavailable and begin rerouting commands targeted for that database to alternate databases.

In addition to marking the database as unavailable, the database monitoring module 135 can also be configured to send a request to an appropriate party, notifying the party that the database requires maintenance. For example, the database monitoring module 135 can be configured to create and send a trouble ticket to a responsible IT department or database administrator.

The database management layer 120 can also include a reporting module 140 configured to track and report all communications and transaction to and from the application layer 105 and database layer 115 and provide detailed analytics of the database layer 115. For example, the database management layer 120 can include a reporting database 145 configured to store all data gathered by the reporting module 140. Managing reporting at the intermediate database management layer 120 allows data from all databases and applications to be stored and monitored at one central location. This can result in highly detailed real-time reports that provide a central and aggregated view of the entire database layer 115.

The reporting module 140 can be configured to communicate with the reporting database 145 to create detailed custom reports. For example, custom reports can be created to do analysis on commands sent to databases, the distribution of databases that received commands, etc. The data can be further displayed by the database management instance 125 and provide information including thread, memory available, session, operations per second, number of operations, etc. In some embodiments, the reporting module can provide data in a timeline to depict changes in performance over time. These are just a few examples and not meant to be limiting. One skilled in the art would recognize that the data can be analyzed and reported in any number of ways known in the art.

FIG. 4A illustrates a screenshot of an exemplary reporting interface. As illustrated, the report presents a near-real-time view of the health of a singular database management instance 402, and the health of the host 404. For the singular database management instance 402, administrators can view uptime, transaction count (e.g., counts of successes/failures), Java Virtual Machine (JVM) stats (such as threads, classes loaded, and memory), etc. The interface lets the administrator do granular searches and refresh the data in the grids. The host health interface 404 presents host health statistics such as database management instance count, CPU usage, memory usage, disk usage, close waits, etc.

FIG. 4B illustrates a screen shot of an exemplary transactions reporting interface illustrating a near-real time view of sessions on a database management instance. Each row of rows 406 represents a command received by the database management instance and includes the command ID, time the command was received, the text of the command, time to execute the command, particular database the command was transmitted to and SID. The reporting interface enables a database administrator to quickly and easily monitor all communications handled by the database management instance in real-time and make changes based upon the reported performance. An administrator can search for a particular transaction. There can also be an AutoFollow mode, which lets users view the transactions on the application server as they occur.

FIG. 4C illustrates an administration interface which provides insight into the health of the underlying databases, and lets and administrator perform administrative tasks on the database management layer. For example, an administrator can enable/disable auto failover, error and state checks, as well as options to execute if a failover is needed. Most databases will eventually need downtime for scheduled maintenance. The interface illustrated in FIG. 4C can also be used to schedule downtime and inform database management instances to detect when other database management instances are on scheduled downtime.

As discussed above, a key feature of the database management layer is enabling an auto-failover if a database goes down. The system administrators can disable the auto-failover feature illustrated in FIG. 4C. Overriding auto-failover is at the discretion of the administrators.

The interface illustrated in FIG. 4C also provides for an option to failover across data centers. When all databases at one datacenter are down, the database management instance determines whether or not to failover to another database in another datacenter.

The interface illustrated in FIG. 4C also provides for an option enabling or disabling a periodic state/error code state check option. The periodic state check option enables the database management instances to check on the state of the database at the end of a determined, reoccurring period. The error code state check option provides for a more robust error checking whereby the database management instance reads and interprets response codes issued from the databases to determine when a database might be responsive, but not functioning properly.

The dashboard illustrated in FIG. 4C can also enable and disable the feature of re-establishing JGroup Clusters. This feature helps to restart the clusters so as to remove a rogue cluster and combine them logically under one group of clusters. It may be necessary to override this feature when the syncing feature is broken, which would result in the auto-failover feature producing a negative customer experience, and Run Diagnostics.

The interface illustrated in FIG. 4C can include a halt listening option. This functionality lets the administrator override the health of a database, marking it as down. It is useful to halt listening if the database is not down but its performance has degraded. The administrator can choose to do the failover manually. Conversely, after a downtime on a database, a resume listening features lets the administrator resume traffic to that database.

FIG. 4D illustrates a rules interface, which presents the rules that are currently deployed to the database. Using this interface, administrators can also view the last time the rules file was loaded into the database management instances. Administrators can load or reload rules to the database management instances. In some embodiments, it is necessary to reload the rules anytime there have been changes made to the rules file. FIG. 4D also illustrates a proxy mode, which disables the rules file's control over all database management instances. In proxy mode, routing goes to the primary database, and traffic is sent to the secondary if the primary instance is down.

Figure 5:
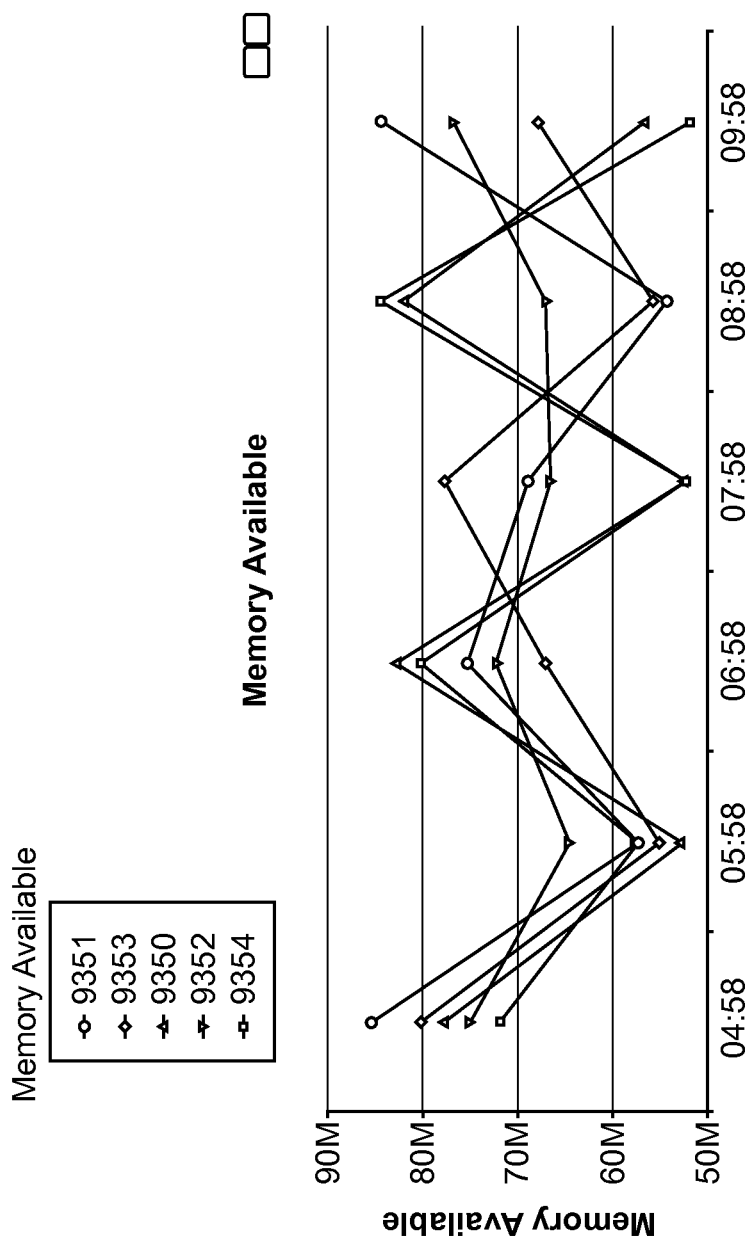
FIG. 5 a screenshot of an exemplary embodiment of a reporting interface in which data is represented over time.

FIG. 4E illustrates a query analysis interface, which allows an administrator to do an analysis of historical data gathered by the database management layer. For example, data stored in the reporting database can be used to create custom reports. As illustrated, a data range can be established for the analysis by entering a start date/time and an end date/time. alternatively, buttons indicating a period can be used to define the data range. As illustrated an eight hour data range has been selected. In this embodiment, the data is regarding a singular database management instance, however this is just one embodiment. The query analysis interface can be configured to segment data to be presented in any number of ways. For example, the query analysis interface can be configured to present data gathered from a single or multiple database management instances, a single database or collection of databases, etc. The requested data range can be presented in any number of ways such as line graph, histogram, etc. FIG. 5 illustrates an exemplary output of one such query analysis.

FIG. 5 illustrates a screenshot of an exemplary embodiment of a reporting interface in which data is represented over time. As illustrated, available memory for multiple database management instances are presents at once as individual lines, with data points taken at the same time intervals. This reporting interface allows a database administrator to easily monitor performance trends and compare performance between multiple instances.

Collectively, the exemplary interfaces illustrated in FIGS. 4-5 can be used to configure, manage, and monitor individual database management instances, or the collective database management instances in the entire database management layer. In some embodiments, the database management instance configuration can analyze the metrics reported on the screens illustrated on FIGS. 4-5 in order to detect problems before they become more serious. For example, the system can be configured to monitor response times, and if response times steadily rise, the system can issue an alert to an administrator as an indicator of a possible upcoming problem.

Figure 6:
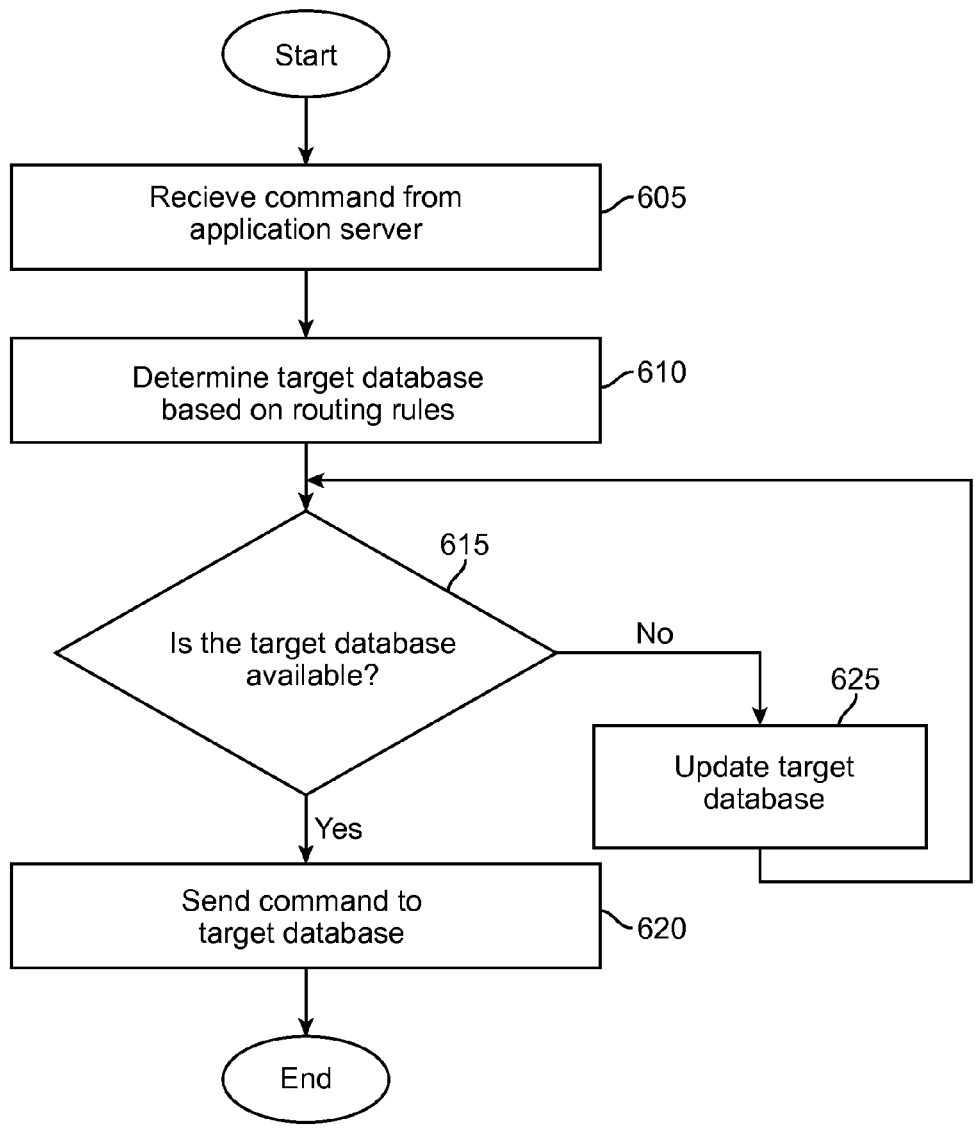
FIG. 6 an exemplary method embodiment of using a database management layer to route communications between an application layer and a database layer.

FIG. 6 illustrates an exemplary method embodiment of using a database management layer to route communications between an application layer and a database layer. As illustrated, the method begins at step 605 when a data command is received at the database management layer. A data command can be any command intended to be performed by a database, such as read data, write data, move data, etc. For example a data command can be an SQL command or query.

After the command is received, the method continues to block 610 where a particular database to receive the command is determined based upon routing rules. The routing rules can specify criteria by which a command is identified and include logic indicating an appropriate database to receive the identified command. In some embodiments, the command can be identified by analyzing the text of the command, including a procedure name, statement, statement parameters, etc. For example, the routing rules can specify that a command be identified by a statement parameter and routed accordingly. In some embodiments, the routing rules can be more complex and specify that a command be identified based on multiple factors such as a combination of procedure name and statement parameters.

In some embodiments, the routing rules can specify that the data command be identified based upon a known number or alpha-numeric string included in the command. For example, the number or alpha-numeric string can be a known parameter of a specific procedure and the routing rules can specify that the data command be identified based upon the parameter and routed accordingly. For example, if the known parameter is an integer or an identification number known to be included in the command, the routing rules can further specify routing the command based upon a grouping of the numbers such as odd and even numbers. In some embodiments, more than two groups can be created based on the identified number by using a modulus function.

In some embodiments the routing rules can specify identifying the command based upon metadata received with the command. This can include information identifying the requesting application server such as a country code or IP address associated with the requesting application server. In some embodiments, the routing rules can specify routing commands to databases best situated geographically from the requesting application server.

In some embodiments, the routing rules can specify identifying the command based upon hints associated with the command. For example, hints can be written into or along with the command as a comment which does not affect the command, however is transmitted to the database management layer as part of the command. The routing rules can specify identifying the command based upon the hint and routing the command accordingly. In this type of embodiment, the hint would be added at the application server level; however, the application code would not be affected because the hint is placed as a comment and thus the application code itself would not be altered.

The above examples of identifying commands and determining a particular database based on routing rules are just a few possible embodiments and are not meant to be limiting. One skilled in the art would recognize that the commands could be identified and routed in any number of ways based on any number of criteria, including but not limited to those discussed above as well as any combination thereof.

Upon determining a particular database to receive the data command, the method continues to block 615 where it is determined whether the particular database is available to receive the command. A database can be determined to be available or unavailable in numerous ways, an embodiment of which is described further in FIG. 7. Upon a determination that the particular database is available, the command is sent to the particular database 620 and the method ends.

It should be clarified that the term particular database is used only for simplicity and can include multiple databases, distributed database, etc. Thus a command can be routed to multiple databases and any returned results can be aggregated prior to being returned to the application layer. For example, the data gathered from multiple databases can be cross-tabulated into one result data set prior to being returned to an application. The application, therefore, sends only one command and is unaware that the command is executed at multiple physical databases. The database management layer manages routing the command to the various databases in a manner that is transparent and seamless to the application.

Returning to the method, if at block 615 it is determined that the particular database is not available; the method continues to block 625 were the particular database is updated based upon the routing rules. For example, the routing rules can specify alternate databases capable of receiving the request as well as an order in which commands should be rerouted to the alternate database. The particular database is thus updated to an alternate database identified by the routing rules and based upon the order specified in the routing rules.

Once the particular database has been updated, the method returns to block 615 where it is determined if the updated particular database is available. If so the command is transmitted to the updated particular database 620. If the updated particular database is not available, the method returns to block 625 and the updated particular database is updated again based upon the routing rules.

Figure 7:
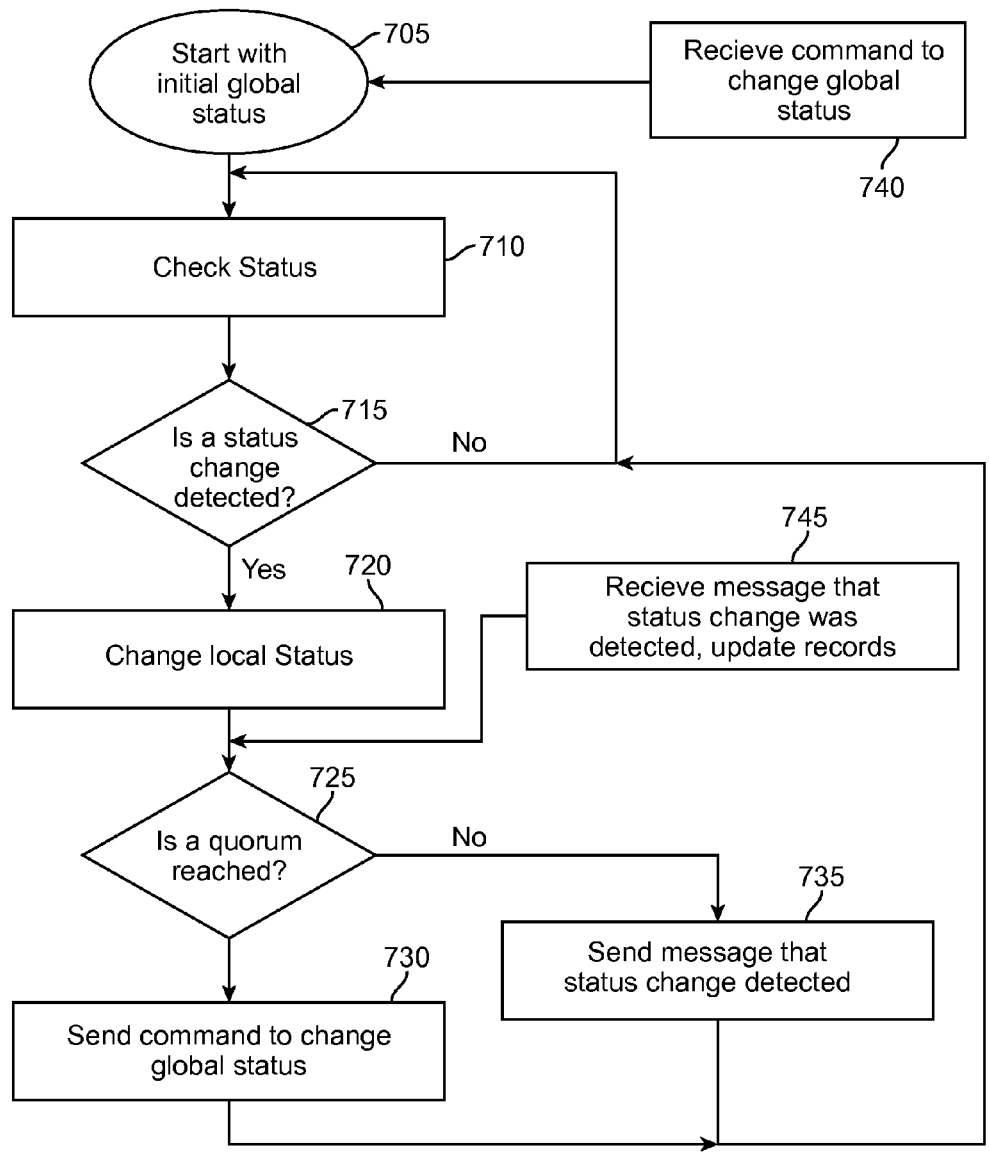
FIG. 7 an exemplary method embodiment in which multiple database management instances work together as a group to determine the availability status of a database.

FIG. 7 illustrates an exemplary method embodiment in which multiple database management instances work together as a group to determine the availability status of a database. Each of the database management instances can be configured to alert the other database management instances that a status change has been detected; however the availability status of the database will not be changed until the status change has been detected by a quorum of the database management instances.

Using this type of method provides numerous advantages. One advantage is that the multiple database management instances perform consistently because the availability status is determined as a group rather than individually. This avoids the problem of having a "split personality" where different database management instances are sending commands to different databases because the database availability status of a database is inconsistent between the multiple database management instances. Another advantage is that a database's availability status is more likely to be correct because it has been determined by multiple database management instances, rather than just one.

As illustrated, the method begins at block 705 where the database is associated with an initial global status. The initial global status can be available or unavailable. The global availability status is the availability status that is used by each of the database management instances when routing commands to a database.

The method continues to block 710 where the database is checked for a status change. The status can be checked in multiple ways. For example, in some embodiments, the database can be actively checked by transmitting a message to the database requesting a status update. For example, the database can be pinged and the availability status can be determined based upon whether a return message is received.

In some embodiments, the availability status can be determined by monitoring communication records of commands sent to the database. For example, the communications can be monitored for errors such as database exceptions known to be fatal. Alternatively, the communications can be monitored for activity indicating that the database is performing correctly. The availability status of the database can be determined based upon the monitored communication records.

Upon determining the availability status of the database, the method continues to block 715 where it is determined if a status change has been detected. The detected status can be compared to the global availability status to determine whether the availability status has changed.

If a status change is detected, the method continues to block 720 where the local availability status of the database is changed. The local availability status is an availability status determined only by the individual database management instance and is not the basis for determining how any of the database management instances perform in connection to the specific database. Rather, the local availability status is used in determining whether the global availability status should be changed.

After the local availability status has been changed, the method continues to block 725 where it is determined if a quorum has been reached regarding the status change. For example, a record can be kept of each other database management instance's local availability status for the database. If the overall number of database management instances that have determined that a status change has occurred is equal to or greater than the predetermined number that represents a quorum, it is determined that a quorum has been reached.

Accordingly, the method continues to block 730 where a global command is sent to each database management instance. The global command indicates that a quorum has been reached in regards to a change in the availability status of the database and that the global availability status of the database is to be changed. The method then returns to block 710.

If at block 725 it is determined that a quorum has not been reached, the method continues to block 735 where a message is transmitted to the other database management instances indicating that a change in status has been detected at the database management instance and that the local availability status has been changed accordingly. The other database management instances can thus update their records to indicate that the local availability status has changed on the database management instance from which the message was received. The method then returns to block 710.

In addition to the method steps described, at any time during the method, a global command can be received 740 from another database management instance that a quorum has been reached and that the global availability status of the database should be changed for each of the database management instances. Upon receiving the message 740, the global availability status is changed accordingly.

Further, at any time a message from another database management instance can be received indicating that a status change has been detected by another database management instance 735 in regards to the database. Upon receiving the message, the records for that database management instance can be changed to reflect the detected change in status. The updated status can then be used in determining whether a quorum has been reached.

Figure 8:
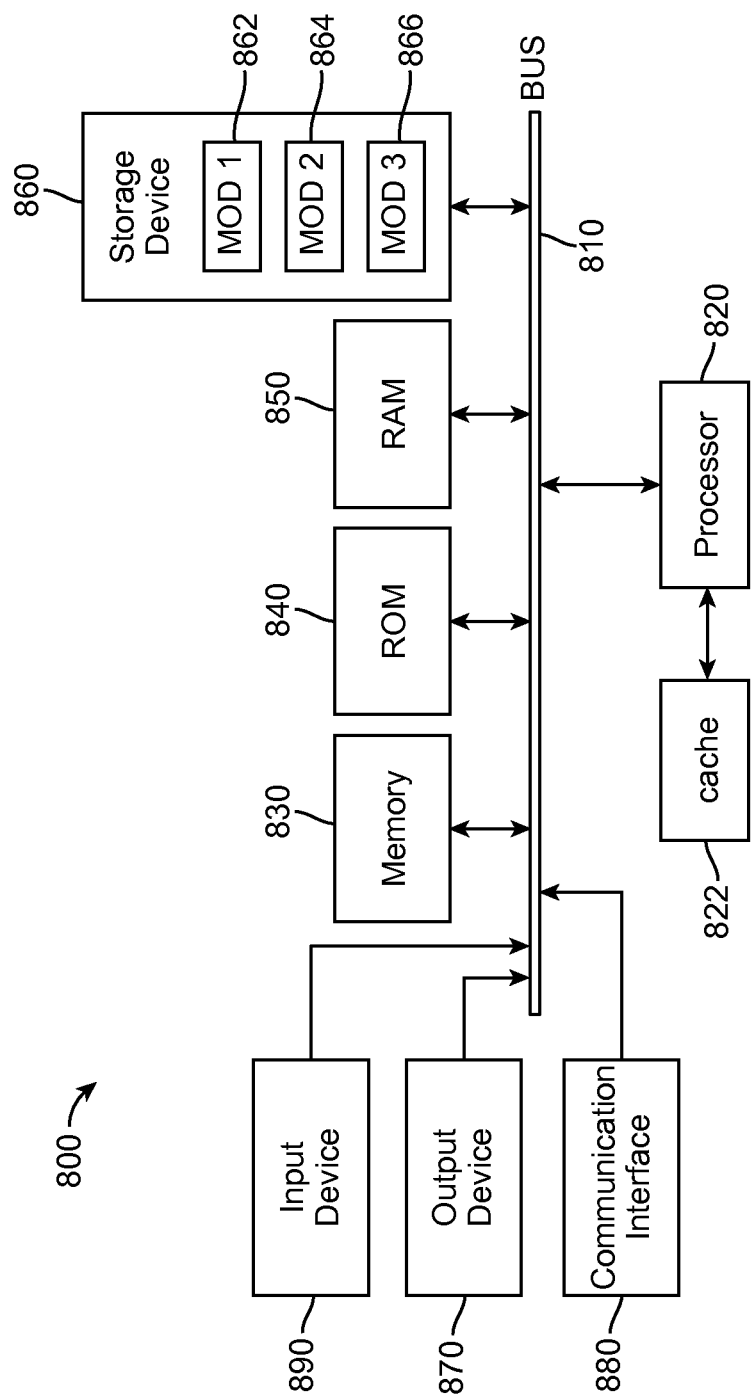
FIG. 8 illustrates an exemplary system embodiment of a general-purpose computing device.

FIG. 8 illustrates an exemplary system 800 that includes a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache 822 provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability.

The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the exemplary embodiment described herein employs the hard disk 860, it should be appreciated by those skilled in the art that other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example, the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod1 862, Mod2 864 and Mod3 866 which are modules configured to control the processor 820. These modules may be stored on the storage device 860 and loaded into RAM 850 or memory 830 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    detecting, by a first database management instance of a set of database management instances, a status change in relation to a first database, wherein the first database management instance maintains a local status and a global status of the first database, and the local status and the global status of the first database are both set as available to process requests;
    in response to detecting the status change:
        changing the local status of the first database to unavailable to process requests, and
        incrementing a local error count maintained by the first database management instance for the first database, the local error count indicating a number of database management instances of the set of database management instances that have detected a status change in relation to the first database;
    after incrementing the local error count, determining, by the first database management instance, that the local error count meets or exceeds a predetermined threshold number; and
    in response to determining that the local error count meets or exceeds the threshold number, changing the global status of the first database to being unavailable to process requests.

2. The method of claim 1, further comprising:
    after changing the global status, transmitting a global command to a second database management instance of the set of database management instances, the global command instructing the second database management instance to change a global status of the first database maintained by the second database management instance to unavailable to process requests.

3. The method of claim 2, wherein the global command causes the second database management instance to set a local status maintained by the second database management instance for the first database to available to process requests.

4. The method of claim 1, further comprising:
while the global status of the first database is set to available to process requests, receiving, from a second database management instance of the set of database management instances, a global command to change the global status of the first database; and
in response to receiving the global command, changing the global status of the first database to unavailable to process requests.

5. The method of claim 1, further comprising:
while the global status of the first database is set to unavailable to process requests, receiving, from a second database management instance of the set of database management instances, a global command to change the global status of the first database; and
in response to receiving the global command, changing the global status of the first database to available to process requests.

6. A first database management instance of a set of database management instances, the first database management instance comprising:
one or more computer processors; and
memory containing instructions that, when executed by the one or more computer processors, cause the first database instance to:
detect a status change in relation to a first database, wherein the first database management instance maintains a local status and a global status of the first database, and the local status and the global status of the first database are both set as available to process requests;
in response to detecting the status change:
change the local status of the first database to unavailable to process requests, and
increment a local error count maintained by the first database management instance for the first database, the local error count indicating a number of database management instances of the set of database management instances that have detected a status change in relation to the first database;
after incrementing the local error count, determining, by the first database management instance, that the local error count does not meet or exceed a predetermined threshold number; and
in response to determining that the local error count does not meet or exceed the threshold number, transmit a message to a second database management instance of the set of database management instances, the message notifying the second database management instance that a status change was detected by the first database management instance in relation to the first database.

7. The first database management instance of claim 6, wherein the message causes the second database management instance to increment a local error count maintained by the second database management instance for the first database.

8. The first database management instance of claim 6, wherein the instructions further cause the first database management instance to:
while the global status of the first database is set to available to process requests, receive, from a second database management instance of the set of database management instances, a global command to change the global status of the first database; and
in response to receiving the global command, change the global status of the first database to unavailable to process requests.

9. The first database management instance of claim 6, wherein the instructions further cause the first database management instance to:
while the global status of the first database is set to unavailable to process requests, receive, from a second database management instance of the set of database management instances, a global command to change the global status of the first database; and
in response to receiving the global command, change the global status of the first database to available to process requests.

10. A non-transitory computer-readable medium containing instructions that, when executed by one or more computer processors of a first database management instance of a set of database management instances, cause the first database instance to:
detect a status change in relation to a first database, wherein the first database management instance maintains a local status and a global status of the first database, and the local status and the global status of the first database are both set as available to process requests;
in response to detecting the status change:
change the local status of the first database to unavailable to process requests, and
increment a local error count maintained by the first database management instance for the first database, the local error count indicating a number of database management instances of the set of database management instances that have detected a status change in relation to the first database;
after incrementing the local error count, determine, by the first database management instance, whether the local error count meets or exceeds a predetermined threshold number, yielding a determination; and
when the determination indicates that the local error count meets or exceeds the threshold number, change the global status of the first database to being unavailable to process requests.

11. The non-transitory computer-readable medium of claim 10, wherein the instructions further cause the first database management instance to:
when the determination indicates that the local error count meets or exceeds the threshold number, transmit a global command to a second database management instance of the set of database management instances, the global command instructing the second database management instance to change a global status of the first database maintained by the second database management instance to unavailable to process requests.

12. The non-transitory computer-readable medium of claim 11, wherein the global command causes the second database management instance to set a local status maintained by the second database management instance for the first database to available to process requests.

13. The non-transitory computer-readable medium of claim 12, wherein the instructions further cause the first database management instance to:
when the determination indicates that the local error count does not meet or exceed the threshold number, transmit a message to a second database management instance of the set of database management instances, the message notifying the second database management instance that a status change was detected by the first database management instance in relation to the first database.

14. The non-transitory computer-readable medium of claim 13, wherein the message causes the second database management instance to increment a local error count maintained by the second database management instance for the first database.

15. The non-transitory computer-readable medium of claim 10, wherein the instructions further cause the first database management instance to:
   while the global status of the first database is set to available to process requests, receive, from a second database management instance of the set of database management instances, a global command to change the global status of the first database; and
   in response to receiving the global command, change the global status of the first database to unavailable to process requests.

16. The non-transitory computer-readable medium of claim 10, wherein the instructions further cause the first database management instance to:
   while the global status of the first database is set to unavailable to process requests, receive, from a second database management instance of the set of database management instances, a global command to change the global status of the first database; and
   in response to receiving the global command, change the global status of the first database to available to process requests.

* * * * *